United States Patent [19]
Zaiki

[11] Patent Number: 5,579,494
[45] Date of Patent: *Nov. 26, 1996

[54] APPARATUS FOR DETECTING POSSIBILITY OF PARALLEL PROCESSING AND METHOD THEREOF AND A PROGRAM TRANSLATION APPARATUS UTILIZED THEREIN

[75] Inventor: Koji Zaiki, Kadoma, Japan

[73] Assignee: Matsushita Electric Industrial Co., Ltd., Osaka, Japan

[ * ] Notice: The term of this patent shall not extend beyond the expiration date of Pat. No. 5,450,554.

[21] Appl. No.: 395,373

[22] Filed: Feb. 21, 1995

Related U.S. Application Data

[63] Continuation of Ser. No. 981,002, Nov. 10, 1992, Pat. No. 5,450,554.

[30] Foreign Application Priority Data

Nov. 11, 1991 [JP] Japan ................ 3-294090

[51] Int. Cl.$^6$ ................................ G06F 9/45
[52] U.S. Cl. .............. 395/588; 364/946.8; 364/973; 364/280.4; 364/262.1
[58] Field of Search ................ 395/700, 375, 395/500

[56] References Cited

U.S. PATENT DOCUMENTS

| | | | |
|---|---|---|---|
| 4,833,606 | 5/1989 | Iwasawa et al. | 364/300 |
| 5,067,068 | 11/1991 | Iwasawa et al. | 395/650 |
| 5,151,991 | 9/1992 | Iwasawa et al. | 395/700 |
| 5,230,053 | 7/1993 | Zaiki | 395/700 |
| 5,253,255 | 10/1993 | Carbine | 371/22.6 |
| 5,317,743 | 5/1994 | Imai et al. | 395/700 |

FOREIGN PATENT DOCUMENTS

| | | |
|---|---|---|
| 1280862 | 11/1989 | Japan . |
| 261727 | 3/1990 | Japan . |
| 3218528 | 9/1991 | Japan . |

OTHER PUBLICATIONS

"Advanced Compiler Optimizations for Supercomputers", by David A. Padua and Michael J. Wolfe, Communications of the ACM, Dec. 1986, vol. 12, No. 12, pp. 1184–1201.

Primary Examiner—David Y. Eng
Attorney, Agent, or Firm—Price, Gess & Ubell

[57] ABSTRACT

The present invention provides an apparatus for detecting possibility to process in parallel a program including a loop where iteration processing is executed comprising a simulation unit for simulating each iteration of the loop in the program, a variable storage unit for storing information based on the simulation as to a variable whose value is defined in a program statement in relation with information showing a location where in the program the value of the variable is defined, and a judgement unit for judging whether or not parallel processing is possible by referring to the variable storage unit for information of the location;

The present invention further provides a program translation apparatus for generating a program applicable to parallel processing based on the detected possibility of executing the program in parallel comprising the simulation unit, the variable storage unit, the judgement unit, and the program generation means for generating the program applicable to parallel processing when it is judged by the judgement unit that parallel processing of the program is possible.

7 Claims, 15 Drawing Sheets

FIG. 9

```
do 10 i=1,10 ─────────────────────────┐
    a(1)=0,0                          │ ╲900
    a(2)=0,0                          │
    c(i)=0,0                          │
    d(i)=0.0                          │
    if(i.eq.1)then                    │
    k=1                               │
    else                              │
    k=2                               │
    endif                             │
    do 20 j=3,10.                     │
    a(j)a(j-k)+b(i,j)+c(i)+d(i)       │
20  continue                          │
    do 10 j=1,10.                     │
    e(i,j)=a(j)                       │
10 continue ──────────────────────────┘
```

FIG. 10

| statement number 101 | intermediate code 102 | link 103 |
|---|---|---|
| 1 | (do 10 i=1,10) | 2 |
| 2 | (a(1)=0,0) | 3 |
| 3 | (a(2)=0,0) | 4 |
| 4 | (c(i)=0,0) | 5 |
| 5 | (d(i)=0,0) | 6 |
| 6 | (if(i,eq,1)) | 7,8,9 |
| 7 | (then k=1) | |
| 8 | (else k=2) | |
| 9 | (do 20 j=3,10) | 10,11 |
| 10 | (a(j)=a(j-k)+b(i,j)+c(i)+d(i)) | |
| 11 | (20 continue) | |
| 12 | (do 10 j=1,10) | |
| ⋮ | ⋮ | ⋮ |

FIG. 12

| | 1201 | 1202 | 1203 | 1204 | 1205 |
|---|---|---|---|---|---|
| | iteration of the loop | array variable | subscript value | data-dependence relation | link |
| 1210 | i=1 | a | 1 | 0 | |
| 1211 | i=1 | a | 2 | 0 | |
| 1212 | i=1 | c | 1 | 0 | |
| 1213 | i=1 | d | 1 | 0 | |
| 1214 | i=1 | a | 3 | 0 | |
| | i=1 | a | 4 | 0 | |

FIG. 14

```
      do 10 i=1,10
      a(1)=0,0
      c(i)=o,o
      d(i)=o,o
      do 10 j=2,10
      call sub(a(j),b(j))
 10   continue

....
      ....

subroutine sub(x,y)
      y=sin(x)*x
      return
```

APPARATUS FOR DETECTING POSSIBILITY OF PARALLEL PROCESSING AND METHOD THEREOF AND A PROGRAM TRANSLATION APPARATUS UTILIZED THEREIN

This is a continuation of prior application Ser. No. 08/981,002, filed on Nov. 10, 1992, now U.S. Pat. No. 5,450,554 for an APPARATUS FOR DETECTING POSSIBILITY OF PARALLEL PROCESSING AND METHOD THEREOF AND A PROGRAM TRANSLATION APPARATUS UTILIZED THEREIN.

BACKGROUND OF THE INVENTION (1) Field of the Invention

The present invention relates to an apparatus and a method for detecting possibility of processing a program in parallel, and an apparatus utilizing detecting results of the above apparatus in translating a program to be applicable to a parallel computer.

(2) Description of the Related Art

Recently, development of the parallel computer system capable of processing a program in parallel has been emphasized. The parallel computer, possessing plural PEs (Processing Element) for executing programs, implements parallel processing by providing each PE with a program.

Generally, a source program described in a higher level language such as FORTRAN is made for serial processing. When such source programs are applied to the parallel computer, a compiler where an object program is generated from the source program needs to be constructed to generate the object program applicable to parallel processing.

A conventional compiler manipulates the source program to generate the object program applicable to the parallel computer. That is, parallelism is extracted from iterations of loop process 3 such as do loop in the source program. Then, each of the iterations is assigned to the PE to be executed in parallel, detail of which is in Paiud, D. A., el al (1986), Advanced compiler optimization for supercomputers, Communications of the ACM, pp. 1184–1201. In addition, "loop" here refers to a set of instructions which can be executed repeatedly and each repetition is relevant to an iteration.

Construction of the conventional compiler is shown in the block diagram of FIG. 1.

An input unit 1 is equipped to be inputted with the source program from the outside.

A memory 2 is equipped to hold programs such as a program for implementing compilation, the source program inputted by the input unit 1, and the object program generated in the compilation.

A processor 3 is equipped to execute compilation based on the program held in the memory 2.

An output unit 4 is equipped to output the object program, which is generated by the processor 3 and is held in the memory 2, to an output device (e.g., a display device, a printer, a file device).

Function of the conventional compiler, which is the compilation made by the processor 3 based on-the program in the memory 2, is shown in the block diagram of FIG. 2.

An input unit 21 is inputted with the source program from the outside.

A loop detector 22 detects loop processing from the source program.

An array detector 23 detects an array from the source program.

A storage unit 24 stores the loop detected by the loop detector 22 and the array detected by the array detector 23.

A judgement unit 25 judges if iterations of the loop can be processed in parallel by referring to what is in the storage unit 24.

An object generation unit 26 generates the object program applicable to parallel processing of the loop when the judgement unit 25 judges that parallel processing is possible while generating the general object program when the judgement unit judges that parallel processing of the loop is impossible.

An output unit 27 outputs the object program to the display device, the printer, the file device and the like.

Operation of the conventional compiler with its construction and function described hereinbefore is described referring to the flow chart of FIG. 3.

First, the source program to be compiled is inputted to the input unit 21 (step 31). An example of such source program is FIG. 4, where two loops ( "Do 20" loop for a variable j, "Do 10" loop for another variable j) are nested inside an outer loop 400 ("Do 10" loop for a variable i).

Second, loop processing is detected by the loop detector 22 from the source program, and the detecting result is stored in the storage unit 24 (step 32). In FIG. 4, a do-statement and a continue-statement in a pair are detected from the source program as loop processing (step 32). Third, whether or not loop processing has been detected is examined (step 33). In FIG. 4 loop processing of the loop 400 has been detected.

Fourth, when loop processing has been detected, an array in loop processing is detected by the array detector 23 and the detecting result is stored in the storage unit 24 (step 34). In FIG. 4 arrays of a(1), c(i), d(i), a(j), e(i, j) on the left side of the statement and arrays of a(j−1), c(j), d(j), a(j) on the right side of the statement in the loop 400 are detected. If loop processing had not been detected in FIG. 4, general object program would be generated for serial processing. Fifth, the judgement unit 25 judges possibility to process the loop in parallel by examining whether or not there exists any data-dependence relation across iterations of the loop based on what is in the storage unit 24 (step 35). More precisely, it is examined whether or not the array on the right side refers to the array on the left side in the same iteration of the loop considering the upper limit value and the lower limit value of the control variable. In FIG. 4 the judgement unit 25 judges that parallel processing of the loop is possible. To be concrete, in "Do 20 loop" the value of the array a(j−1) on the right side of the statement varies between 1 and 9 when the upper limit value and the lower limit value of control variable j are defined to be 2 and 10 respectively (j=2–10). Such value range of the array a(j−1) has been defined before the loop 400 by the arrays of a(j) varying between 2 and 10 and a(1) so that no data-dependence relation exists across iterations of the loop 400. In addition, possibility of processing in parallel the loops nested in the loop 400 including the "Do 20" loop and the "DO 10" loop is left unjudged here.

Finally, when no data-dependence relation exists, the object program is generated to process the loop in parallel (step 36). If there were any data-dependence relation across iterations of the loop, the general object program would be generated (step 37). In FIG. 4 the object program is generated to process the loop 400 in parallel.

As is described hereinbefore, conventionally whether or not a data-dependence relation exists is judged by referring to the upper and lower limit value of a control variable in a do-statement and also a subscript statement in an array.

However, conventional judgement is inaccurate as to following loops.

(1) A loop holds an if-statement and the value of a variable is not obtained until the if-statement is executed.

(2) A loop holds a subroutine which may have the data-dependence relation.

(3) A subscript statement of an array in a loop includes computation which is not predetermined.

Thus, conventionally processing one of above three loops in parallel is judged to be impossible even when it is logically possible.

SUMMARY OF THE INVENTION

Accordingly, it is one object of the present invention to provide a method for judging possibility of processing in parallel a loop in the source program accurately.

It is the second object of -the invention to provide a method for detecting possibility of processing in parallel a loop when a loop holds an if-statement.

It is the third object of the invention to provide a method for detecting possibility of processing in parallel a loop when a subscript statement of an array in the loop holds computation.

It is the fourth object of the invention to provide a method for detecting possibility of processing in parallel a loop when the loop holds a subroutine.

It is the fifth object of the invention to provide an apparatus wherein the above objects are implemented.

It is further object of the invention to provide an apparatus utilizing the detected results of the apparatus in translating the program to be applicable to the parallel computer.

The above object is fulfilled by the apparatus for detecting possibility to process in parallel a program including a loop where iteration processing is executed. The apparatus comprises a simulation unit for simulating each iteration of the loop in the program, a variable storage unit for storing information based on the simulation by the simulation unit as to a variable whose value is defined in the program statement in relation with information showing a location where in the program the value of the variable is defined, and a judgement unit for judging whether or not parallel processing is possible by referring to the variable storage unit for information of the location.

The simulation unit may comprise a variable detector for one side for detecting the variable from one side of an assignment statement based on the simulation, an iteration identification unit for identifying which iteration of the loop includes the assignment statement based on the simulation, and a registration unit for registering to the variable storage unit information of the variable detected by the variable detector in relation with information of the iteration identified by the iteration identification unit.

The registration unit may be equipped to register name of the variable as information of the variable.

The judgement unit may comprise variable detector for the other side for detecting the variable from the other side of the statement based on the simulation, and a data-dependence judgement unit for judging that no data-dependence relation exists when the variable detected by the variable detector for the other side has been stored at the same iteration of the loop in the variable storage unit.

The data-dependence judgement unit may be equipped to judge that the data-dependence relation exists when the variable detected by the variable detector for the other side has not been stored at the same iteration but at a previous iteration of the loop in the variable storage unit.

The data-dependence judgement unit may be equipped to judge that no data-dependence relation exists when the variable detected by the variable detector for the other side has not been defined in the loop but has been defined before the loop.

The judgement unit may further comprise a determination unit for determining that iterations of the loop can be processed in parallel when no data-dependence relation exists in any iteration of the loop.

The judgement unit may further comprise a selection unit for selecting the iteration of the loop with no data-dependence relation therein from all iterations of the loop, and a determination unit for determining that the iteration of the loop with no data-dependence relation therein can be processed in parallel.

The variable storage unit may be equipped to store the variable with subscript to store the subscript held therein.

The simulation unit may further comprise a computation simulation unit for simulating computation when it is included in the program.

The computation simulation unit may be equipped to simulate, when the subscript held in the said variable is shown in the computation expression, the computation therein.

The simulation unit may further comprise a conditional statement detector for detecting a conditional statement from the program, a conditional expression judgement unit for judging a conditional expression in the detected conditional statement, and a branch control unit for controlling to simulate the next statement by referring to the judging result.

The simulation unit may further comprise the computation simulation unit for simulating, when the conditional expression in the conditional statement is in-the form of the computation expression, the computation therein.

The simulation unit may further comprise a subroutine call statement detector for detecting a subroutine call statement from the program, a subroutine simulation control unit for controlling to simulate the subroutine directed by the detected subroutine statement, and an argument delivery unit for delivering an argument when simulating the subroutine in the program statement.

The simulation unit may further comprise a loop detector for detecting the loop in the program, and a control unit for controlling to simulate processing of the detected loop.

The above object is fulfilled by an apparatus for detecting possibility to process in parallel a program having plural program statements and including a loop wherein iteration processing is executed. The apparatus comprises a readout unit for reading out statements in the program to be simulated next one at a time, a variable detector for an array on the left side of the statement for detecting name of a variable on the left side of the statement when the statement in the program is an assignment statement, a variable detector for an array on the right side of the statement for detecting name of a variable on the right side of the statement, an iteration identification unit for identifying an iteration of the loop where the assignment statement is executed when the variable is detected, a storage for holding at least two areas: one for the identified iteration and the other for the variable, a registration unit for registering to the storage the iteration identified by the iteration identification unit in relation with name of the variable on the left side of the statement detected by the variable detector, a data-dependence detector for explaining whether or not the variable detected by the array detector has been registered to the variable area in the storage, and a parallelism judgement unit for judging the iteration which can be processed in parallel by referring to the detecting result from data-dependence detector where the data-dependence relation is examined.

The above object is fulfilled by a parallelism possibility detecting method for detecting possibility of processing in parallel a program having plural program statements and including a loop where iteration processing is executed. The method comprises steps of simulating each iteration of the loop in the program, storing based on the simulation information as to a variable whose value is defined in a program statement in relation with information showing a location where in the program the value of the variable is defined, and judging whether or not parallel processing is possible by referring to the variable storage unit for information of the location.

The simulation step may comprise a first sub step of detecting a variable from one side of the program statement based on the simulation when the program statement is an assignment statement, a second sub step of identifying which iteration of the loop includes the assignment statement based on the simulation, and a third sub step of registering to the variable storage unit information of the variable detected at the first sub step in relation with information of the iteration identified at the second sub step.

The step of judging may comprise a fist sub step of detecting a variable from the other side of the program statement based on the simulation, and a second sub step of detecting no data-dependence relation when information of the variable detected at the first sub step has been stored in the same iteration of the loop at the step of storing information as to the variable of the defined value.

At the second sub step parallel processing of the loop may be judged to be impossible when no data-dependence relation is detected in any iteration of the loop.

The above object is fulfilled by a program translation apparatus for generating a program applicable to parallel processing based on the detected possibility of executing the program in parallel. The apparatus comprises a simulation unit for simulating each iteration of a loop in a program, a variable storage unit for storing information based on the simulation by the simulation unit as to a variable whose value is defined in a program statement in relation with information pointing out a location where in the program the value of the variable is defined, a judgement unit for judging whether or not parallel processing is possible by referring to the variable storage unit for information of the location, and a program generation unit for generating the program applicable to parallel processing when it is judged by the judgement unit that parallel processing of the program is possible.

The simulation unit may be equipped to simulate each iteration of the loop in the program.

The registration unit may be equipped to store information based on the simulation by the simulation unit as to the variable whose value is defined in the program statement in relation with information pointing out the location where in the program the value of the variable is defined.

The judgement unit may be equipped to judge whether or not parallel processing is possible by referring to the variable storage unit for information of the location.

The data-dependence judgement unit may be equipped to judge that a data-dependence relation exists when the variable detected by the variable detector for the other side has not been stored at the same iteration but at a previous iteration of the loop in the variable storage unit.

The data-dependence judgement unit may be equipped to judge that no data-dependence relation exists when the variable detected by the variable detector for the other side has not been defined in the loop but is defined before the loop.

The judgement unit may further comprise a determination unit for determining that iterations of the loop can be processed in parallel when no data-dependence relation exists in any iteration of the loop.

The simulation unit may further comprise a selection unit for selecting the iteration of the loop with no data-dependence relation therein from all the iterations of the loop, and a determination unit for determining that the iteration of the loop with no data-dependence relation therein can be processed in parallel.

The variable storage unit may be equipped to store the variable with a subscript to store the subscript held therein.

The simulation unit may further comprise a computation simulation unit for simulating the computation when it is included in the program.

The computation simulation unit may be equipped to simulate, when the subscript is shown in a computation expression, the computation therein.

The simulation unit may further comprise a conditional statement detector for detecting a conditional statement from the program, a conditional expression judgement unit for judging a conditional expression in the detected conditional statement, and a branch control unit for controlling to simulate the next statement by referring to the judging result.

The simulation unit may further comprise a computation simulation unit for simulating, when the conditional expression in the detected conditional statement is in the form of the computation expression, the computation therein.

The simulation unit may further comprise a subroutine call statement detector for detecting a subroutine call statement from the program, a subroutine simulation control unit for controlling to simulate-the subroutine directed by the detected subroutine statement, and an argument delivery unit for delivering an argument when simulating the subroutine.

The simulation unit may further comprise a loop detector for detecting the loop in the program, and a control unit for controlling to simulate processing of the detected loop.

The above object is fulfilled by a program translation apparatus for generating a program applicable to parallel processing based on the detected possibility of executing the program in parallel. The apparatus comprises a readout unit for reading out statements in the program to be simulated next one at a time, a variable detector for an array on the left side of the statement for detecting name of a variable on the left side of the statement when -the statement in the program is an assignment statement, a variable detector for an array on the right side of the statement for detecting name of a variable on the right side of the statement, an iteration identification unit for identifying an iteration of the loop where the assignment statement is executed when the variable is detected, a storage for holding at least two areas: one for the detected iteration and the other for the variable, a registration unit for registering to the storage the iteration identified by the iteration identification unit in relation with name of the variable on the left side of the statement detected by the variable detector, a data-dependence detector for examining whether or not the variable detected by the array detector has been registered to the variable area in the storage, and a parallelism judgement unit for judging the iteration which can be processed in parallel by referring to the detecting result from data-dependence detector where the data-dependence relation is examined, and a program generation unit for generating the program applicable to parallel processing when it is judged by the judgement unit that the parallel processing is possible.

According to the present invention, whether or not a source program can be processed in parallel is judged accurately no matter what the program is.

To be precise, according to an apparatus and a method of the present invention for detecting possibility of processing the program in parallel, wherein the simulation system is manipulated to detect easily where the value of a variable is defined and where the value of the variable is referred to, it is judged accurately whether or not a data-dependence relation exists regardless of the following: what the form of the subscript statement in the array is (whether or not computation is held therein) and whether or not the loop holds the if-statement or the subroutine. Hence, it is further judged easily whether or not parallel processing of the loop is possible.

Also, according to a program translation apparatus of the present invention, the detecting result as to possibility of parallel processing is examined in translating the program (e.g., the source program is translated to generate the object program) so that an object program is generated from the source program whose parallelism is judged accurately.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 9 is an example of the source program.

FIG. 10 is an illustration showing a storage form of the intermediate code of FIG. 9 generated in the embodiment of the present invention.

FIG. 12 is an illustration showing what is stored in an array variable definition table in the embodiment of the present invention shown in FIG. 9.

FIG. 14 is an example of the source program.

DESCRIPTION OF THE PREFERRED EMBODIMENT

Figure 1:
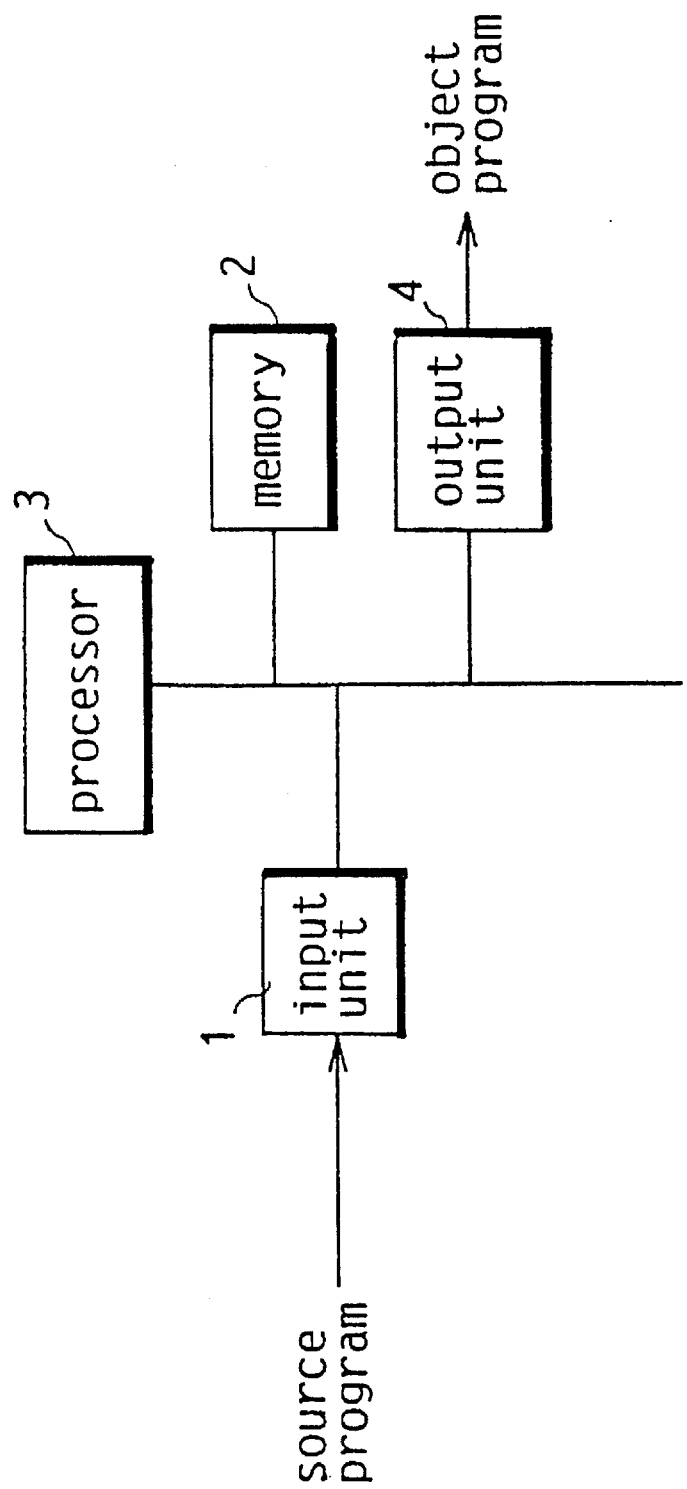
FIG. 1 is an illustration showing construction of a conventional compiler.
Figure 2:
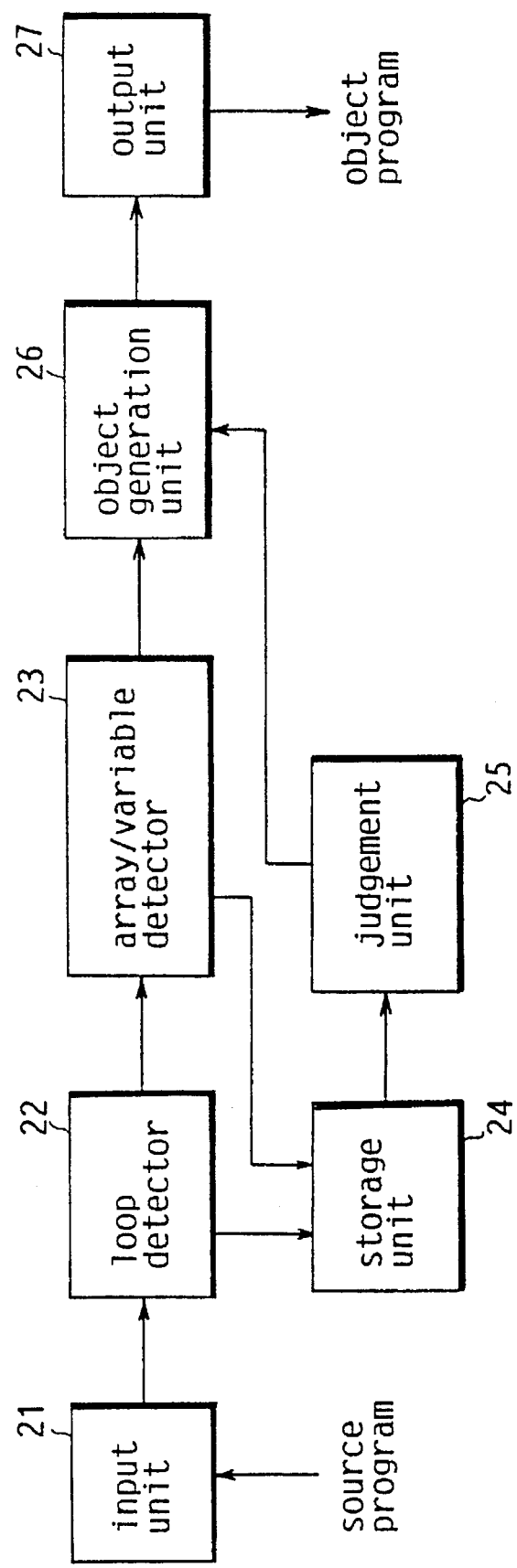
FIG. 2 is a block diagram showing function of the conventional compiler.
Figure 3:
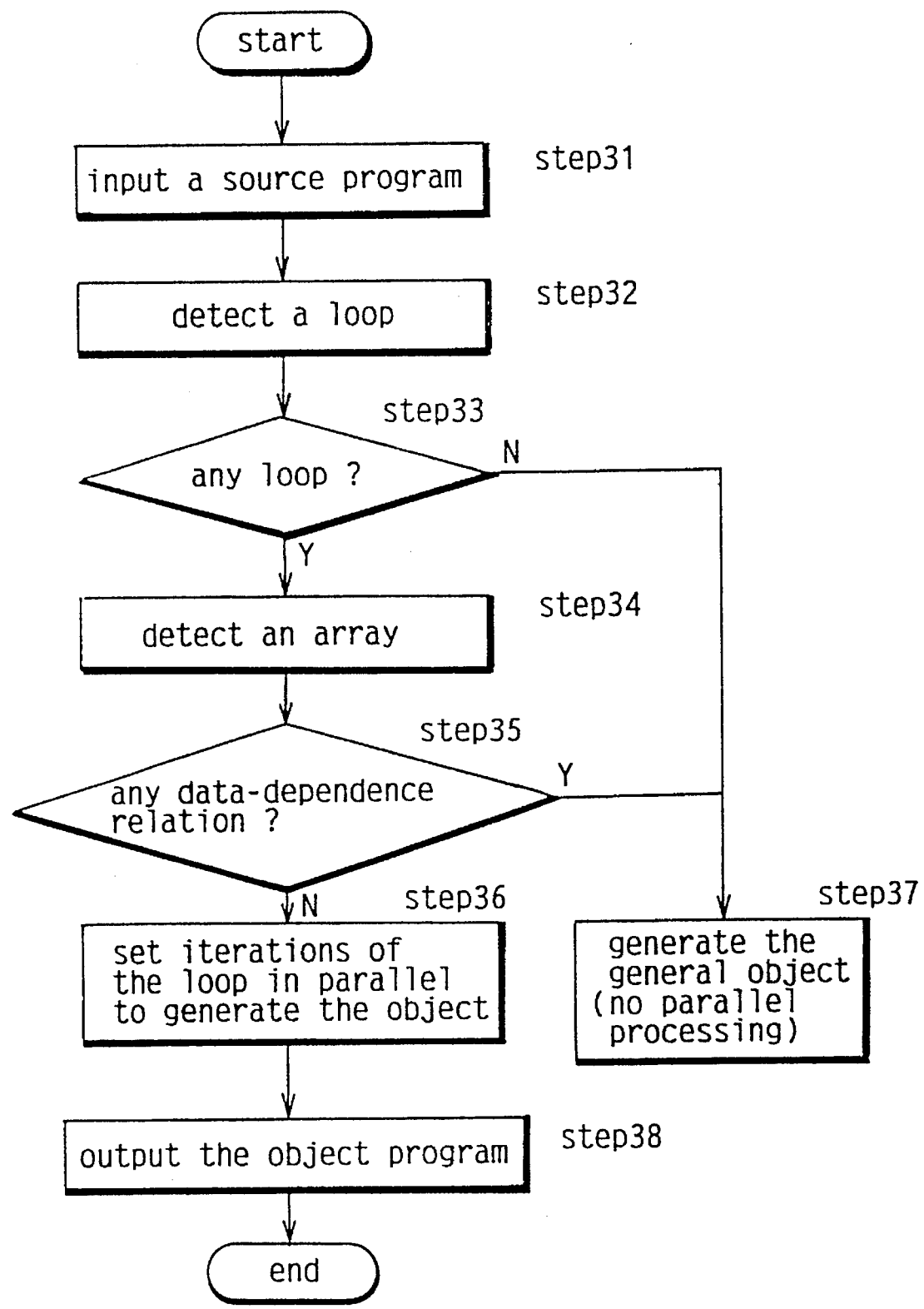
FIG. 3 is a flow chart depicting processing of the conventional compiler.
Figure 4:
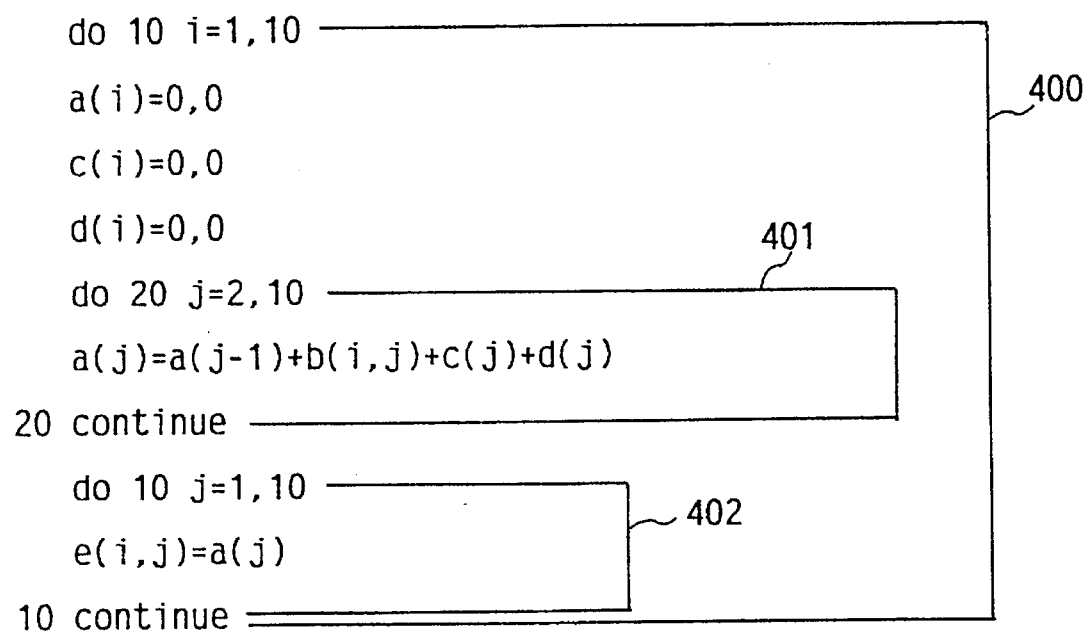
FIG. 4 is an example of a source program.
Figure 5:
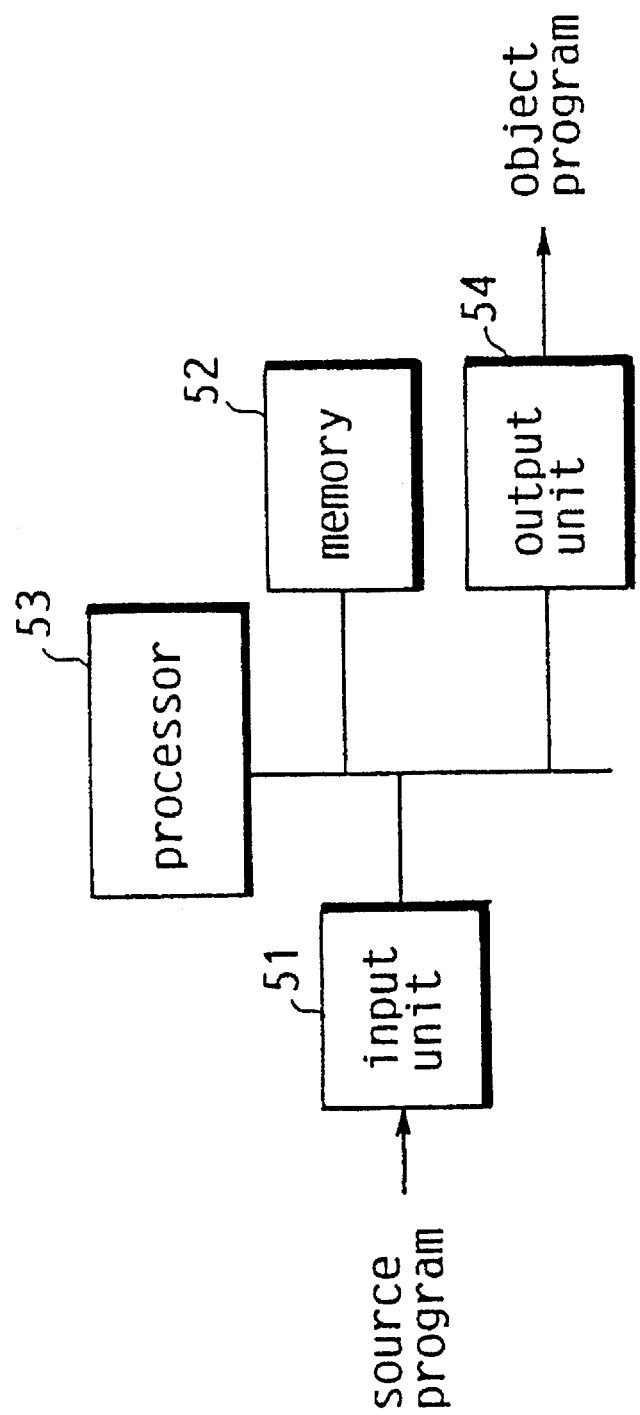
FIG. 5 is an illustration showing construction of a compiler utilized in the embodiment of the present invention.

Referring now to drawings an embodiment of the compiler of the present invention is described. Construction of the compiler is shown in the block diagram of FIG. 5.

An input unit 52 is equipped to be inputted with the source program from the outside.

A memory 52 is equipped to hold programs such as the program for implementing compilation, the source program inputted to the input unit 51, and an object program generated in the compilation.

A processor 53 is equipped to execute compilation based on the program in the memory 52.

An output unit 54 is equipped to output the object program, which is generated by the processor 53 and is held in the memory 52, to an output device (e.g. the display device, the printer, the file device).

Figure 6:
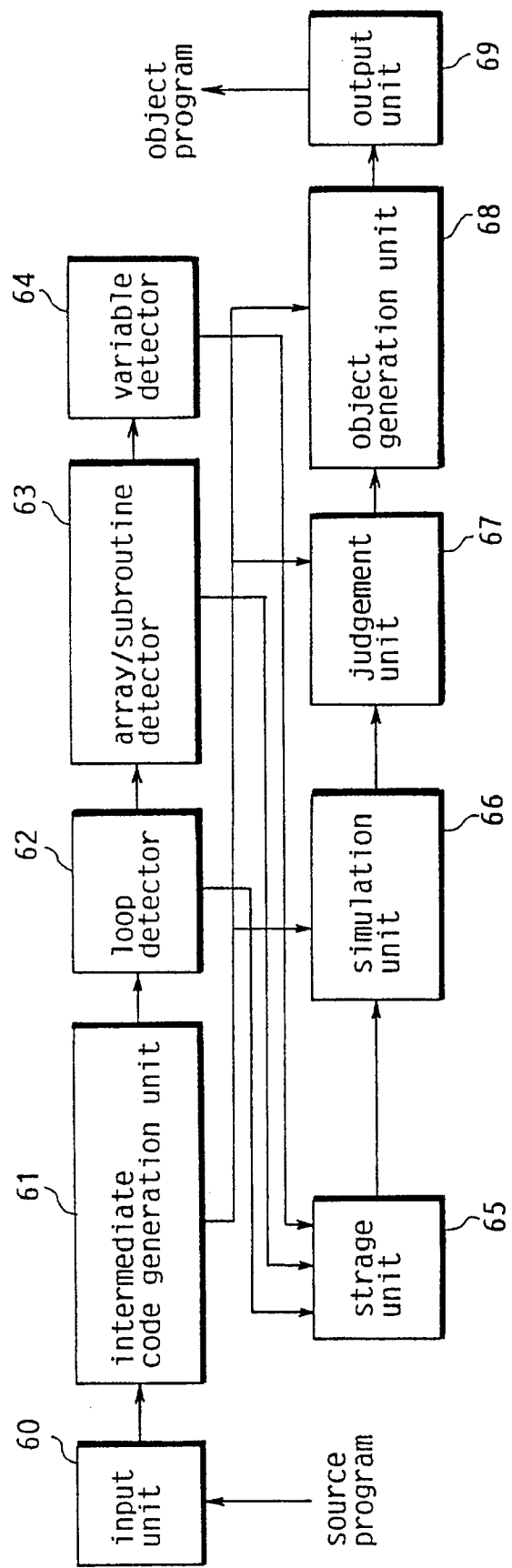
FIG. 6 is a block diagram showing function of the compiler utilized in the embodiment of the present invention.

Function of the compiler relevant for compilation of the processor 53 based on the program in the memory 52 is shown in the block diagram of FIG. 6.

An input unit 60 is inputted with the source program input from the outside.

An intermediate code generation unit 61 translates the source program from a higher level language such as FORTRAN into the intermediate code.

A loop detector 62 detects loop processing from the source program.

An array/subroutine detector 63 detects an array and a subroutine from the source program.

A variable detector 64 detects a variable (scalar variable) from the source program.

A storage unit 65 stores the loop processing detected by the loop detector 62 and the array detected by the array/subroutine detector 63.

A simulation unit 66 simulates the program described in the intermediate code by referring to the storage unit 65 for information about the loop, the array, and the subroutine.

A judgement unit 67 judges whether or not parallel processing of the loop is possible by referring to simulation and the storage unit 65.

An object generation unit 68 generates the object program applicable to parallel processing when parallel processing of the program is judged to be possible by the judgement unit 67 while generating the general object program when parallel processing is judged to be impossible.

An output unit 69 outputs the object program to the device including the display device showing a display to an operator, the printer printing a paper medium, and the file device storing the program as a file.

Figure 7:
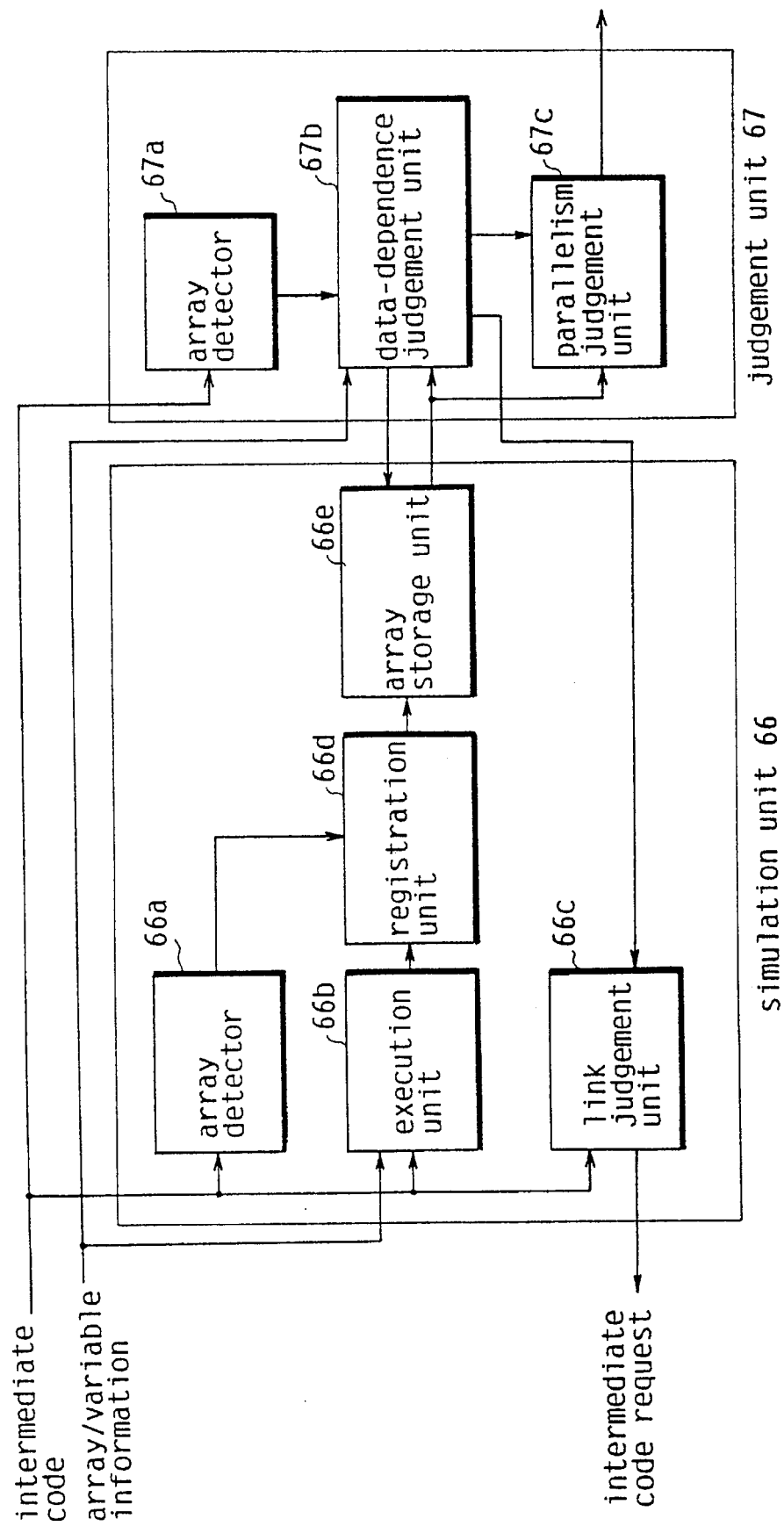
FIG. 7 is a block diagram showing function of a simulation unit and a judgement unit utilized in the embodiment of the present invention.

Function of the simulation unit 66 and judgement unit 67, which is shown in FIG. 6 briefly, is shown in detail in the block diagram of FIG. 7. The simulation unit 66 has an array detector 66a for arrays on the left side of the statement, an execution unit 66b, a link judgement unit 66c, a registration unit 66d, and an array storage unit 66e. The judgement unit 67 has an array detector 67a for an array on the right side of the statement, a data-dependence judgement unit 67b, and parallelism judgement unit 67c.

The array detector 66a detects an array on the left side of the statements which are inputted by the intermediate code generation unit 61 one at a time.

The execution unit 66b simulates the statements described in the intermediate code one at a time, which are inputted by the intermediate code generation unit 61.

The link judgement unit 66c judges the link inputted to request the storage unit 65 for the next statement.

The registration unit 66d registers the array detected by the array detector 66a from the left side of the statement to the array storage unit 66e by referring to the execution result of the execution unit 66b.

The array storage unit 66e stores the array registered by the registration unit 66d, in other words the array on the left side of the statement.

The array detector 67a detects an array from the right side of the statements inputted one at a time by the intermediate code generation unit 61.

The data-dependence judgement unit 67b judges existence of a data-dependence relation by examining whether or not the array on the right side, which is detected by the array detector 67a, has been registered to the array storage unit 66e; a data-dependence relation exists when the array has been registered while no data-dependence relation exists when the array has not been registered.

The parallelism judgement unit 67c judges possibility to process the loop in parallel by examining whether or not a data-dependence relation exists across iterations of the loop: parallel processing is possible when no data-dependence relation exists while parallel processing is impossible when a data-dependence relation exists.

Figure 8:
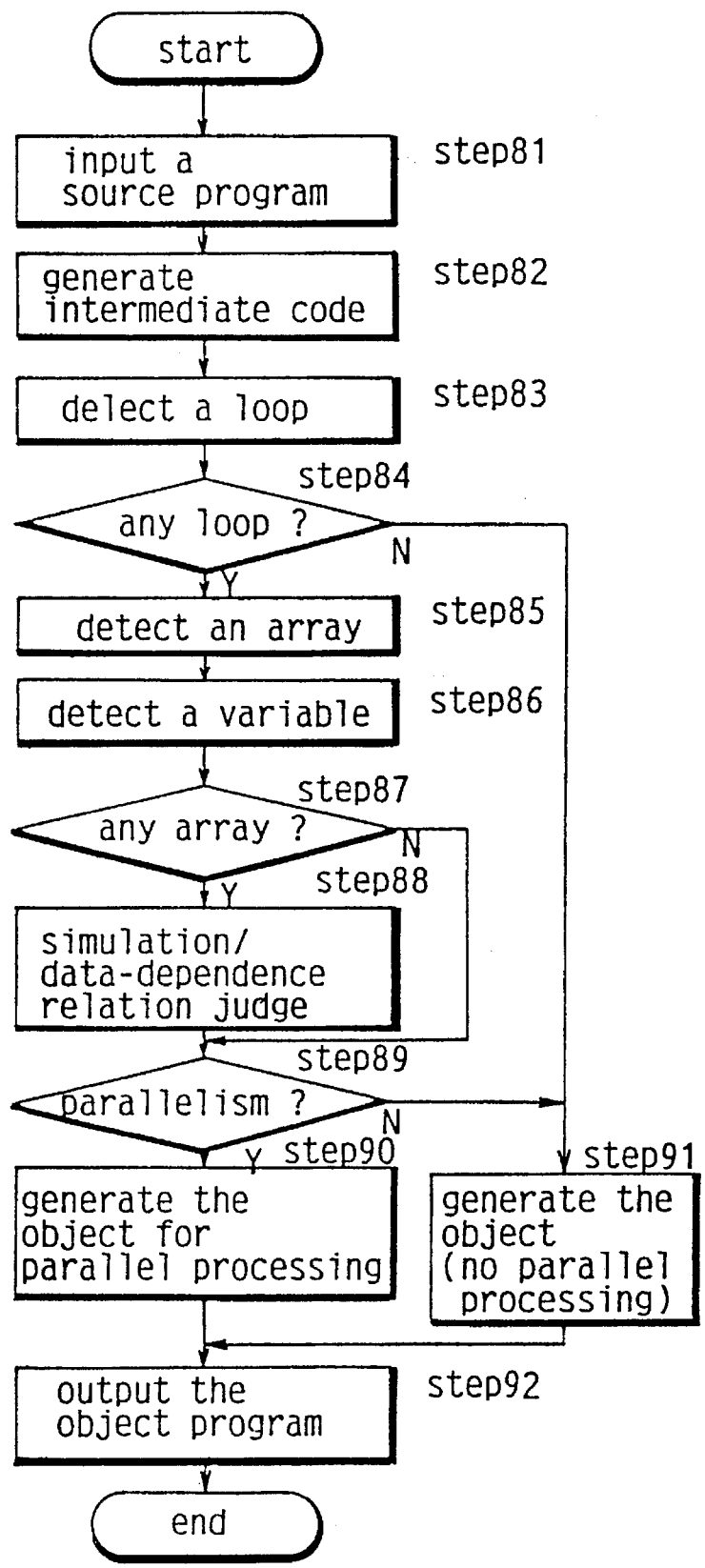
FIG. 8 is a flow chart depicting processing of the compiler utilized in the embodiment of the present invention.

Operation of the compiler of the present invention with its construction and function described hereinbefore is described referring to the flow chart of FIG. 8.

First, the source program to be compiled is inputted to the input unit 60 (step 81). An example of such source program is FIG. 9, where two loops ("Do 20" loop for variable j and "Do 10" loop for another variable j) are nested inside an outer loop 900 ("Do 10" loop for variable i).

Second, the source program inputted by the input unit 60 is translated into the intermediate code by the intermediate code generation unit 61 and is stored in the storage unit 65 (step 62). The storage form of the intermediate code of FIG. 9 is FIG. 10, where a statement number column 101 shows a statement number; an intermediate code column 102 shows the intermediate code statement enclosed with a parenthesis; a link column 103 shows the link pointing the next statement (a pointer for pointing the statement number of the statement to be simulated next).

Figure 11:
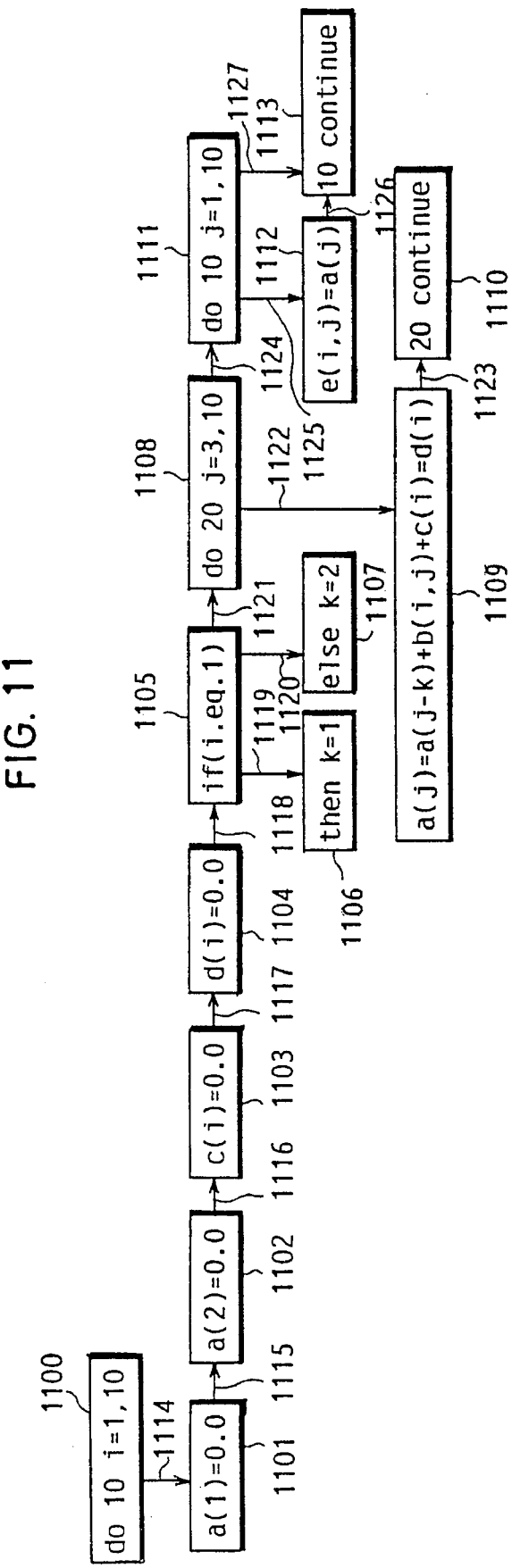
FIG. 11 is an illustration showing a link image of the intermediate code of FIG. 9 generated in the embodiment of the present invention.

The link image showing relation between the intermediate code statements of FIG. 9 is illustrated in FIG. 11, where 1100 is an outer do-statement; each of 1108 and 1111 is an do-statement inside the outer do-statement 1100; each of 1101 through 1104 is an assignment statement for the array variable; each of 1109 and 1112 is the assignment statement for the array variable of the inside do-statement 1111; 1105 is a conditional branch order; each of 1106 and 1107 is an assignment statement; each of 1110 and 1113 is a continue-statement; and each of arrows 1114 through 1127 is a link showing construction of the program.

Third, loop processing is detected by the loop detector 62 and the detecting result is stored in the storage unit 65 (step 83). In FIG. 11 the do-statement and the continue-statement in a pair are detects as loop processing. Fourth, the detecting result is examined (step 84). In FIG. 11 the loop of the do-statement and the continue-statement has been detected. If no loop processing had been detected, the general object program would be generated for serial processing.

Fifth, when loop processing has been detected, the array and the subroutine are detected by the array/subroutine detector 63 and the detecting result is stored in the storage unit 65 (step 85). In FIG. 11 arrays of a (1), a (2), c (i), d (i), a (j), e (i, j) on the left side of the statement and arrays of a (j−k), b (i, j), c (i), d (i), a (j) on the right side of the statement are detected from the loop of the do-statement 1100 and the continue-statement 1113, which are stored in the storage unit 65. Sixth, the variable is detected by the variable detector 64 from the loop and the detecting result is stored in the storage unit 65 (step 86). In FIG. 11 a variable k in the conditional branch order is detected from the do loop and is stored in the storage unit.

Figure 13:
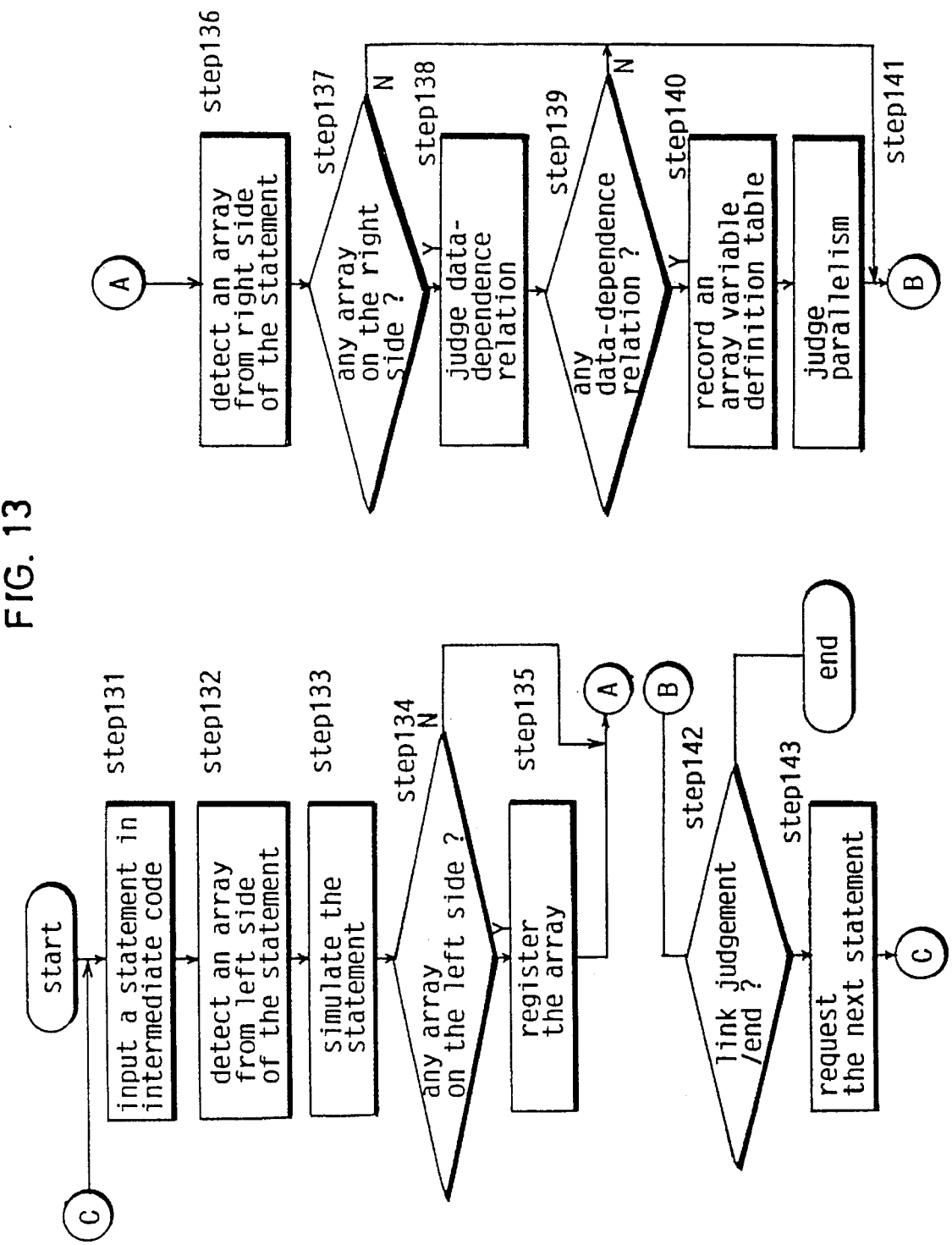
FIG. 13 is a flow chart depicting processing of the simulation unit and the judgement unit in the embodiment of the present invention.

Seventh, whether or not an array has been stored in the storage unit 65 is examined by the simulation unit 66 (step 87). In FIG. 11 the arrays have been stored. If no array had been stored, the general object program would be generated. Eighth, when the array has been stored, it is judged whether or not a data-dependence relation exists (step 89). Thus, the simulation unit 66 and the judgement unit 67 simultaneously takes in the statements described in the intermediate code one at a time, and the former unit simulates each statement by referring to what is in the storage unit and registers the array on the left side of the statement to the array variable definition table while the latter unit judges whether or not a data-dependence relation exists in the simulated statement. Operation of such simulation and judgement taking place one after the other as to the statement in FIG. 11 are described referring to the flow chart of FIG. 13 showing processing of the simulation unit 66 and the judgement unit 67 besides FIGS. 7, 11, 12.

(Simulation of the do-statement 1100 in FIG. 11)

When the do-statement 1100 is inputted to the array detector 66a and the execution unit 66b (step 131 in FIG. 13), the array detector 66a finds no array on the left side of the statement(step 132). The statement 1100 is simulated. To be concrete, after recognizing the followings: the statement inputted is the do-statement; the upper limit value of the control variable is 10; and the lower limit value of the control variable is 1, the execution unit 66b determines the value of the control variable i to be 1 (i=1) and stores such value in the storage unit 65 (step 133). It is checked that no array has been detected from the left side of the do-statement 1100 (step 134).

The array detector 67a finds no array from the right side of the statement 1100 (step 136), and informs so to the data-dependence judgement unit 67b (step 137). The data-dependence judgement unit 67 then informs the link judgement unit 66c that judgement operation is completed (in this case no array to be judged is found) when the execution unit 66b finishes simulating the do-statement 1100.

Informed that judgement of a data-dependence relation is completed, the simulation unit 66 examines a link 1114 which has been inputted thereto with the intermediate code (step 142) and requests the storage unit 65 for a statement 1101 pointed by the link 1114 to be simulated next (step 143).

(Simulation of the assignment statement 1101)

When the assignment statement 1101 is inputted to the array detector 66a and the execution unit 66b (step 131), the array detector 66a detects the array of a (1) from the left side of the statement (step 132) and informs so to the registration unit 66d. Identifying the statement inputted thereto with an assignment statement, the execution unit simulates the statement (step 133). When the statement 1101 is simulated, the detected array of a(1) is registered by the registration unit 66d to the array storage unit 66e (step 135). A registration form utilized in the array storage unit 66e is shown in FIG. 12.

In FIG. 12 an iteration information column 1201 provides the iteration (in other words, the value of the control variable in the loop) where an array exists. An array variable column 1202 provides the name of the array to be registered. A subscript value column 1203 provides a subscript value of the array. A data-dependence relation column 1204, which is filled in by the data-dependence judge unit, provides information of whether or not a data-dependence relation exists. A link column 1205 provides a pointer pointing the array whose control variable is identical with but subscript is different from the array which has been registered. Now in this case the array of a(1) is registered to a row 1210 in FIG. 12 (the data-dependence column 1204 is left blank).

The array detector 67a finds no array on the right side of the statement (step 136), and informs so to the data-dependence judgement unit 67b (step 137). The data-dependence judgement unit 67b informs the link judgement unit 66c that judgement operation is completed (no array to be judged exists in this case).

Informed that judgement of the data-dependence relation is completed, the link judgement unit 66c examines the link 1115 which has been inputted thereto when the intermediate code has been inputted to the simulation unit 66 (step 142), and requests the storage unit 65 for the next statement (1102 in FIG. 11) pointed by the link 1115 (step 143).

(Simulation of an assignment statement 1102)

Following the substantially same operation conducted in simulation of the statement 1101 stated above, the array detector 66b registers the array of a(2) detected from the left side of the statement 1102 to the array storage unit 66e, and the link judgement unit 66c requests for the next statement, the statement 1108. To be concrete, recognizing that the array of a(1) whose name is identical to the array of a(2) which has been registered, the registration unit 66d registers the array of a(2) to the row of 1211 in the array variable definition table of FIG. 12 as well as registers to the link column 1205 on the row of 1210 the pointer showing where the array of a(2) is registered (step 185).

(Simulation of an assignment statement 1103)

Although subscript statement of the array c(i) is i, the value of i has been determined to be 1 by the execution unit 66b so that c(1) instead of c(i) is registered to the row of 1212 in FIG. 12 by following the operation substantially same as the above.

(Simulation of an assignment statement 1104)

Following the operation substantially same as the above, the array of d (1) is registered to the row of 1213 in FIG. 12.

(Simulation of an if-statement 1105)

When the if-statement 1105 is inputted to the simulation unit 66 (step 131), the array detector 66a recognizes that the statement is not an assignment statement (not a statement defining the value of the array) so that it does not operate any detection (step 132), and informs so to the registration unit 66d. The execution unit 66b, identifying the statement 1105 with the conditional branch order, simulates the conditional statement to follow the order, and then judges if the condition is satisfied. Since value of the control variable i is 1 (i=1), the execution unit 66d judges that the condition is satisfied (step 133), and informs so to the link judgement unit 66c. The array detector 67a finds no array on the right side of the statement (step 136), and informs so to the data-dependence judgement unit 67b (step 137). The data-dependence judgement unit 67b informs to the link judgement unit 66c that the judgement operation is completed. The link judgement unit 66c selects a link 1119 from the three links (refer to the link column on the row of statement number 6 in FIG. 10) since the link 1119 points the statement to be simulated when conditional is satisfied (step 142), and requests for the next statement (a then-statement 1106) (step 143).

(Simulation of the then-statement 1106)

When the then-statement 1106 is inputted to the array detector 66a and the execution unit 66b (step 131), the array detector 66a detects no array from the left side of the statement (step 132) and informs so to the registration unit 66d. The execution unit 66b executes k=1 (in other words, stores k=1 in the storage unit 65)(step 133) and informs the link judgement unit 66c that simulation of the then-statement is completed. When the array detector 67a finds no array on the right side of the statement (step 136), the data-dependence relation judgement unit 67b informs the link judgement unit 66c that judgement operation is completed. The link judgement unit 67b examines a link 1121, the link from the if-statement which has been previously inputted thereto (step 142), and requests for the statement to be simulated next, a do-statement 1108 (step 143).

(Simulation of a do-statement 1108)

When the do-statement 1108 is inputted to the array detector 66a and the execution unit 66b (step 131), the array detector 66a detects no array from the left side of the statement (step 132), and informs so to the registration unit 66d. The execution unit 66b recognizes that the upper limit value and the lower limit value of the control variable j in the do-statement 1108 are 10 and 3 respectively, and then stores 3 as the control variable to begin with (step 133). The operation onwards is substantially same as the operation in simulating the do-statement 1100.

(Simulation of an assignment statement 1109)

When the assignment statement 1109 is inputted to the array detector 66a and the execution unit 66b (step 131), the array detector 66a detects the array of a(j) from the left side of the statement (step 132) and informs so to the registration unit 66d. The execution unit 66b obtains the value of the subscript in each array by referring to the storage unit 65. Since the values of i, k, and j stored in the storage unit 65 are 1, 1, and 3 respectively (i=1, k=1, j=3) the assignment statement is recognized to be as follows: a(3)=a(2)+b(1, 3)+c(1)+d(1). The value of each array obtained by referring to the storage unit 65 is further referred to obtain the value of the array a(3), which is stored in the storage unit 65 (step 133).

Informed that the array of a(j) has been detected (step 134), the registration unit 66d registers the array of a(3) to the array storage unit 66e since the execution unit 66b determines the value of the subscript j to be 3 (j=3) (step 135).

The array detector 670 detects the arrays of a(j–k), b(i, j), c(i), and d(i) from the right side of the statement (step 136), and informs so to the data-dependence relation judgement unit 67b (step 137). Then the data-dependence relation judgement unit 67b judges whether or not a data-dependence relation exists (step 138).

To be concrete, the array of a(j–k) on the right side of the statement is recognized to be a(2) since the execution unit 66b determines the value of the control variable j to be 3 (j=3) and the storage unit 65 stores 1 as the value of the variable k (k=1) obtained from simulation. Then, the data-dependence judgement unit 67b judges if a data-dependence relation exists across iterations of the loop by examining whether or not the array of a(2) has been stored in the array storage unit 66e. In this case the array of a(2) is found in the array storage unit 66e (row 1211 in FIG. 12) so that the data-dependence judgement unit 67b judges that no data-dependence relation exists across iterations of the loop.

Next, the array of b(i, j) on the right side of the statement is recognized to be b(1, 3) since the value of i and j gained from the execution unit 66b are 1 and 3 respectively (i=1, j=3). Then, whether or not the array of b(1, 3) has been stored in the array storage unit 66e is examined to judge whether or not a data-dependence relation exists. That is, when it has been stored, it is judged that no data-dependence relation exists. When it has not been stored, a data-dependence relation exists unless the following condition is satisfied: the array of b(1, 3) has not been stored in other iterations of the loop but has been stored in the storage unit 65 as detecting result of the array/subroutine detector 63. In this case the array of b(1, 3) has not been stored in the array storage unit 66e but has been stored in the storage unit 65 (the array b (i, j) has already been defined before the loop) so that no data-dependence relation across iterations of the loop exists.

The array of c(i) on the right side of the statement is recognized to be c(1) since the value of i obtained from the execution unit 66b is 1 (i=1). Then, whether or not the array of c(1) has been stored in the array storage unit 66e is examined. In this case the array of c(1) is found therein (row 1212 in FIG. 12) so that no data-dependence relation across iterations of the loop exists. Also for the array of d(i) on the right side of the statement no data-dependence relation across iterations of the loop exists, the same as for the array of c(i) (step 138).

If a data-dependence relation were judged by the data-dependence relation judge unit 67b to exist in any of the arrays judged in this case (step 139), the data-dependence relation column 1204 on the row of the array having the data-dependence relation would be recorded with 1 (step 140). Then, this would be informed to the parallelism judgement unit 67c.

No data-dependence relation exists in any array in the actual case so that the link judgement unit 66c is informed that judgement operation of a data-dependence relation is completed (step 139).

When informed that judgement operation of a data-dependence relation is completed, the link judgement unit 66c examines the link pointing the next statement(step 142), and requests the storage unit 65 for the next statement (step 143).

(Simulation of a continue-statement 1110)

When the continue-statement 1110 is inputted (step 131), the execution unit 66b identifies the statement 1110 with the order-statement to iterate the "Do 20" loop. The execution unit judges either renewing the value of the control variable or exiting from the loop, which depends on whether or not the value of the control variable obtained from simulation of the do-statement 1108 and stored in the storage unit reaches to 10, its upper limit value; it judges exiting from-the loop when the value is 10 while it judges renewing the value when it does not reach to 10. In this case the value of the control variable j is not 10 but 3 so that the execution unit renews the control variable to be 4 (j=4). The link judgement unit 66c identifies the link 1122 with the link pointing the next statement (step 142) and requests for the next statement (step 143).

Operation in simulating the statement 1108 in the "Do 20" loop with the control valuable j of 4 to 10 (j=4–10) is substantially same as the above except the following. When the value of the control variable is 10 (j=10), the link judgement unit 66c identifies the link to the next statement with a link 1124 (step 142) and requests for the statement pointed by the link 1124 (step 143).

(Simulation of a do-statement 1111, an assignment statement 1112, and a continue statement 1113)

This simulation is operated substantially same as simulation of the do-statement 1108 through the continue statement 1110 above. The array of e(1, j) where i=1 is applied to the original array e(i, j) on the left side of the statement is registered to the array storage unit 66e. Next, the array of a(j) on the right side of the statement is found in the array storage unit 66e so that no data-dependence relation exists.

(Simulation after the continue statement 1113)

When simulation of the do statement 1111 ends with the control variable j of 10 (j=10), the above assignment statements of 1101 through 1113 in the "Do 10" loop are iterated for control variable i being renewed until i reaches to the upper limit value of 10.

Simulation of a statement and judgement of a data-dependence relation are executed as is described hereinbefore (step 88 in FIG. 8). That is, according to the result from simulation and judgement executed, possibility of parallel processing is judged by the judgement unit 67. When a data-dependence relation is detected by the data-dependence judgement unit 67c, the parallelism judgement unit 67 judges that parallel processing of the loop is impossible. In the example program of FIG. 11 the parallel processing of the "Do 10" loop for the control variable i is judged to be possible since the parallelism judge unit 67 is not informed that there exists any data-dependence relation (step 89). Then, the object generation unit 68, where an object program is generated in the intermediate code, generates the object program where the "Do 10" loop for the control variable i is processed in parallel (step 90). Finally, the generated program is output from the output unit 69 such as the printer (step 92).

Although in this embodiment only the "Do 10" loop for i is judged as for possibility of the parallel processing, the "Do 20" loop for j and the "Do 10" loop for another j may also be judged by the apparatus of the present invention.

Also in the above embodiment, simulation and judgement of a data-dependence relation are executed one after the other for each of the statements. However, simulation of any statement may start after a data-dependence relation is judged in all the statements.

(Example of a program including a subroutine)

Figure 15:
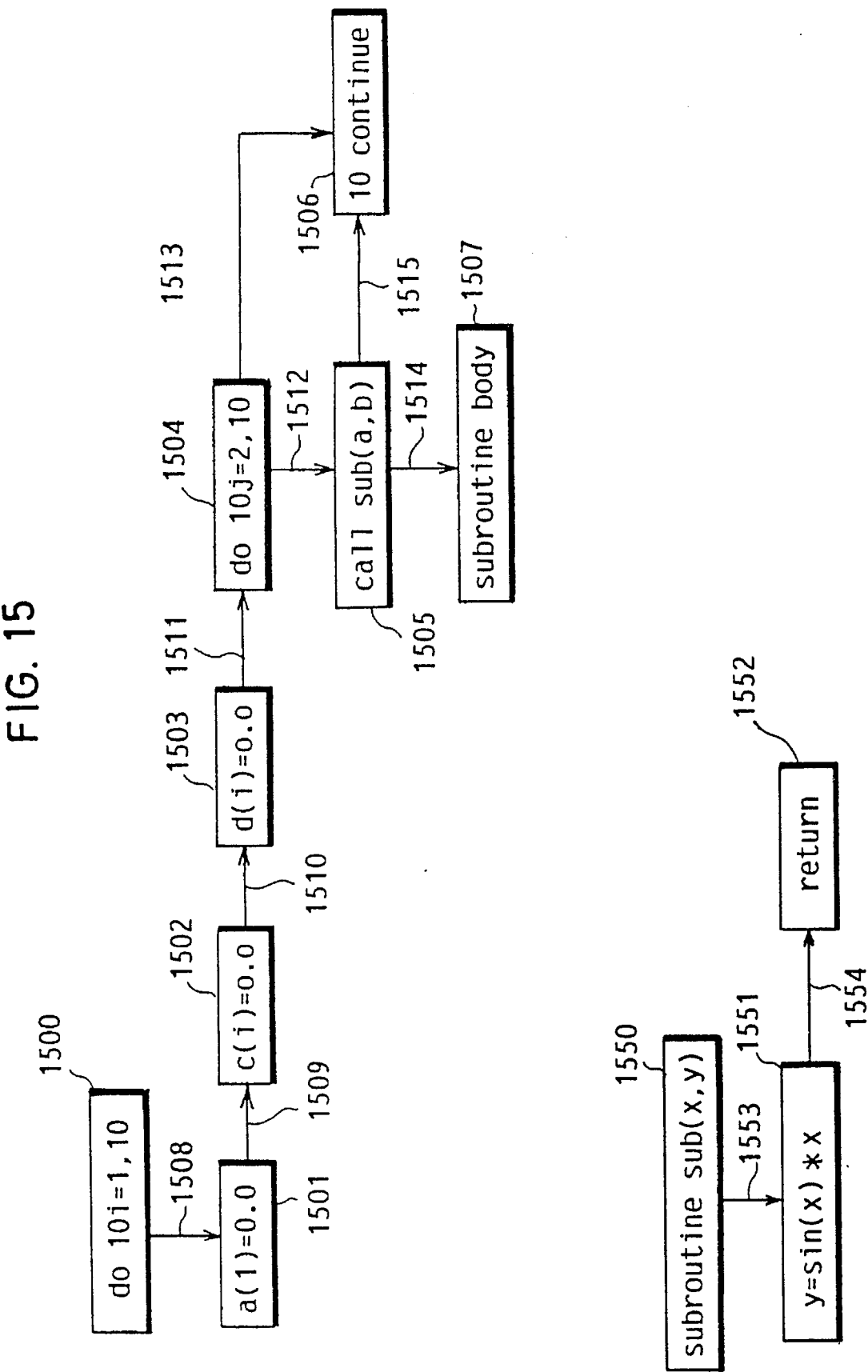
FIG. 15 is an illustration showing a link image of the intermediate code of FIG. 14 generated in the embodiment of the present invention.

FIG. 14 is an example of the source program including a subroutine call statement. An illustration showing the source program of FIG. 14 translated into the intermediate code is FIG. 15, where each of 1500 through 1506 and 1550 through 1552 is the statement in the source program translated into the intermediate code; each of arrows 1508 through 1515 and 1550 through 1552 is the link showing construction of the program; 1507 is the subroutine body program which is called by a call statement 1505; and 1550 through 1554 is the illustration of the subroutine body 1507.

Simulation of the program in FIG. 14 is described referring to FIGS. 7 and 13 except the operation substantially same as the above simulation of the program in FIG. 9, which includes simulation of 1500 through 1504 in FIG. 14. The value of the control variable j in the do-statement is supposed to be 2 (j=2) in the following.

(Simulation of a call statement 1505)

When the call statement 1505 is inputted to the simulation unit 66 of FIG. 7, the execution unit 66b identifies the statement with the call statement and searches the storage unit 65 for the subroutine body program designated by the call statement and detects arguments of a(2) and b(2) therefrom (step 133 in FIG. 13). The link judgement unit 66c examines the link pointing the subroutine body program (step 142) and requests for the next statement (step 143).
(Simulation of a subroutine statement 1550)

Inputted with the subroutine statement 1550, the execution unit 66b supposes x and y, both of which are manipulated in the subroutine statement, to be a(2) and b(2) respectively, and then memorizes the correlation between a(2) and x as well as between b(2) and y. The link judgement unit 66c examines the link (step 142) and requests for the next statement (step 143).
(Simulation of an assignment statement 1551)

The array detector 66a detects as the array on the left side of the statement the argument a(2) which corresponds to the variable y (step 132), and informs so to the registration unit 66d. The execution unit 66d executes the assignment statement of y=sin (x) to obtain the value of a(2) corresponding to y (step 133). The registration unit 66d, which is informed that the argument a(2) is detected for y (step 134), registers to the array storage unit 66e the value of a(2) obtained from execution of the assignment statement (step 135).

The array detector 67a detects as the array on the right side of the statement the argument b(2) which corresponds to the variable x (step 136), and informs so to the data-dependence judgement unit 67b. The data-dependence judgement unit 67b, which is informed that the argument b(2) is detected for x (step 137), judges whether or not a data-dependence relation exists. That is, it is judged whether or not the array b(2) has been registered in the array storage unit 66e at the iteration of the loop executed for j=2. Even when b(2) has not been registered to the iteration of the loop for j=2 in the storage unit 65, it is still judged no data-dependence relation exists if the following condition is satisfied: the array b(2) has not been registered to a previous iteration of the loop (j =1) but has been defined before the loop based on what is in the storage unit 65 (in other words, b(2) is on the left side of the statement). In this case the array of b(2) has not been registered to the iteration of the loop for j=2 but is defined at the storage unit 65 so that it is judged that no data-dependence relation exists (step 138). Since no data-dependence relation exists (step 139), the link judgement unit 66c examines the link (step 142) and requests for the next statement (step 143).
(Simulation of a return statement 1552)

Inputted with the return statement 1552, the link judgement unit 66c examines the link (step 142) and requests for the next statement (step 143).
(Simulation of a continue statement 1506)

The operation executed after this is substantially same as the operation in the program example of FIG. 9.

Following the operations described hereinbefore, whether or not a data-dependence relation exists in a program is judged accurately even when the program includes a subroutine such as the program example of FIG. 14. That is, the correlation between the argument and the variable is obtained and the argument is detected as the array of a main routine, which is later registered to the array variable definition storage table of the array storage unit 66e

Not only one-dimension array which is mainly referred to in the above example, but also an array of multiple dimensions such as a two-dimension array will also lead the accurate judgement of parallelism. When an array of multiple dimensions is detected, the subscript column 1203 in the array variable definition table of FIG. 12 is registered with the same number of subscripts as dimensions.

Also possibility to process in parallel a plurality of loops nested inside another loop can be judged by producing the array variable definition table of FIG. 12 for each loop. Otherwise, the loop iteration information column 1201 is registered with a plurality of control variables when one array variable definition table is utilized.

In the above embodiment the parallelism judgement unit 67c judges that parallel processing of the loop is impossible when there is a data-dependence relation in any iteration of the loop based on the judging result from the data-dependence judgement unit 67b. This judgement is effective when all iterations of the loop are processed in parallel. Besides such application of the present invention, the judgement unit 67b is constructed to select the iterations where no data-dependence relation exists therein from the whole loop. To be precise, the data-dependence judgement unit 67b collects the iterations including no data-dependence relation therein by referring to the data-dependence relation column 1204 in the array storage unit 66e and judges them to be processed in parallel when it finishes examining all iterations of the loop as to a data-dependence relation.

What is claimed is:

1. An apparatus for detecting whether iterations of a program loop can be processed in parallel, wherein the program loop includes at least one of a conditional branch statement, a variable appended with a subscript which is determined by a calculation, and a subroutine call statement, the apparatus comprising:

simulation means for simulating each iteration of the program loop;

variable storage means for storing values of variables, which are defined in program statements executed during simulation of the iterations, each value being stored with information showing both a location in the program where the value of the variable is defined and a number of the simulated iteration in which the variable is defined; and judgment means for judging that parallel processing is possible when, for each simulated iteration, variables whose values are referred to in program statements of a current iteration are defined in preceding program statements within the current iteration.

2. A parallelism possibility detecting method for detecting whether a program having a plurality of program statements including an iterative loop can be processed in parallel, wherein the program ..loop includes at least one of a conditional branch statement, a variable appended with a subscript which is determined by a calculation, and a subroutine call statement, the method comprising the following steps:

simulating each iteration of the loop in the program;

storing values of variables that are defined by program statements executed during simulation of the iterations, each value being stored with information showing a location in the program where the value of the variable is defined and the simulated iteration number in which the variable is defined; and judging that parallel processing is possible when, for each simulated iteration, variables whose values are referred to in program statements of a current iteration are defined in preceding program statements within he current iteration.

3. A program translation apparatus for generating a program applicable to parallel processing if a possibility of executing the program in parallel is detected, wherein the program loop includes at least one of a conditional branch statement, a variable appended with a subscript which is determined by a calculation, and a subroutine call statement, the program translation apparatus comprising:

simulation means for simulating each iteration of the program loop;

variable storage means for storing values of variables, which are defined in program statements executed during simulation of the iterations, each value being stored with information showing both a location in the program where in the program the value of the variable is defined and a number of the simulated iteration in which the variable is defined;

judgment means for judging that parallel processing is possible when, for each simulated iteration, variables whose values are referred to in program statements of a current iteration are defined in preceding program statements within the current iteration; and program generation means for generating the program applicable to parallel processing when it is judged by the judgment means that parallel processing of the program is possible.

4. A compiler for receiving a source program and generating an object program that is applicable to parallel processing, comprising:

an input unit for inputting the source program;

a detector for detecting a loop in the source program, and for further detecting at least one of an array, a subroutine, and a variable in the source program;

a memory for storing information relating to the detected items;

simulation means for simulating execution of the source program by referring to the stored information, the simulation means registering variables on left sides of instructions in the memory as the instructions are executed during each iteration of the program loop;

judgement means for judging whether variables on right sides of instructions have been previously registered, the judgement occurring at the simulation of each instruction, the judgement means determining that parallel processing is possible when all variables on the right sides of instructions for each iteration have been registered for each iteration; and an object program generation unit for generating the object program that is applicable to parallel processing when parallel processing of the loop is judged to be possible, and for generating a general object program that is not applicable to parallel processing if parallel processing of the loop is judged to be impossible.

5. An apparatus for determining whether a plurality of iterations of a program loop can be processed in parallel, each iteration of the program loop requiring execution of a segment of instructions within the program loop, the apparatus comprising:

simulation means for executing the segment of instructions once for each iteration of the program loop to thereby simulate execution of the program loop, the simulation means registering variables on left sides of instructions, and corresponding iteration numbers, as the instructions are executed during each iteration of the program loop; and judgement means for judging whether variables on right sides of instructions have been previously registered, the judgement occurring at the simulation of each instruction, the judgement means further determining that the plurality of iterations of the program loop can be processed in parallel when all variables on the right sides of instructions for each iteration have been registered for each iteration.

6. An apparatus for determining whether a plurality of iterations of a program loop can be processed in parallel, each iteration of the program loop requiring execution of a segment of instructions within the program loop, the apparatus comprising:

executing means for executing the segment of instructions once for each iteration of the program loop to thereby simulate execution of the program loop;

registering means for registering variables on left sides of instructions as the instructions are executed during each iteration of the program loop, each variable being registered with an iteration number indicating the iteration during which the instruction was executed;

data-dependence judgement means for judging whether variables on right sides of instructions have been previously registered, the judging occurring at the simulation of each instruction; and parallelism judgement means for judging that the plurality of iterations of the program loop can be processed in parallel when all variables on the right sides of instructions for each iteration have been registered for each iteration, and for judging that the plurality of iterations of the program loop cannot be processed in parallel when at least one variable on the right side of an instruction has not been registered for an iteration.

7. A compiler for receiving a source program and generating an object program that is applicable to parallel processing, comprising:

an input unit for inputting the source program;

a detector for detecting a loop in the source program, and for further detecting at least one of an array, a subroutine, and a variable in the source program;

a memory for storing information relating to the detected items;

simulation means for simulating execution of the source program by referring to the stored information, the simulation means registering variables that are defined by program statements in the memory as the instructions are executed during each iteration of the program loop, each variable being registered with information on a number of the simulated iteration;

judgement means for judging whether variables on right sides of instructions have been previously registered, the judgement occurring at the simulation of each instruction, the judgement means determining that parallel processing is possible when all variables on the right sides of instructions for each iteration have been registered for each iteration; and an object program generation unit for generating the object program that is applicable to parallel processing when parallel processing of the loop is judged to be possible, and for generating a general object program that is not applicable to parallel processing if parallel processing of the loop is judged to be impossible.

* * * * *